United States Patent [19]
Uchida et al.

[11] Patent Number: 5,216,896
[45] Date of Patent: Jun. 8, 1993

[54] TEMPERATURE CONTROL SYSTEM FOR ABSORPTION REFRIGERATING APPARATUS

[76] Inventors: Suichiro Uchida, 6-11-13, Inayoshihigashi, Chiyodamura, Niihari-gun, Ibaraki-ken; Ryohei Minowa, 1-125, Takucho Bangai, Ushiku-shi, both of Japan

[21] Appl. No.: 830,296

[22] Filed: Jan. 31, 1992

[30] Foreign Application Priority Data

Feb. 1, 1991 [JP] Japan ................. 3-011908

[51] Int. Cl.$^5$ ............................................. F25B 15/00
[52] U.S. Cl. ........................................ 62/148; 62/175; 62/201; 236/78 D
[58] Field of Search .............. 62/148, 141, 203, 201, 62/185, 175, 208, 209, 434, 435, 436; 236/1 E, 1 EA, 1 ER, 1 EB, 78 D

[56] References Cited

U.S. PATENT DOCUMENTS 2,984,458  5/1961  McFarlan ........................ 62/435 X
4,090,372  5/1978  Lamb ................................ 62/141

FOREIGN PATENT DOCUMENTS 105659  7/1982  Japan .

*Primary Examiner*—Harry B. Tanner

[57] ABSTRACT

There is disclosed a temperature control system for an absorption refrigerating apparatus comprising an evaporator, an absorber, a condenser, a regenerator, a solution heat exchanger, a solution pump, a cooling medium pump, and piping operatively connecting these parts together. Where absorption refrigerating machines are arranged in two or more stages with respect to the flow of cold water to be circulated at a load side, the machine of each stage has a cold water outlet temperature detector, and a temperature controller for controlling the amount of heat of a machine-driving heated fluid in accordance with the cold water outlet temperature of each stage. A control circuit is so arranged that the temperature controller of the first stage, or the temperature controllers of the intermediate stages except for the temperature controller of the final stage are controlled by a proportional control whereas the temperature controller of the final stage is controlled by a PID control. Where the absorption refrigerating machine is provided in a single stage, the temperature control system comprises a proportional controller which detects an inlet temperature or an intermediate path temperature of the cold water so as to control the refrigerating machine, and a PID controller which detects an outlet temperature of the cold water so as to control the refrigerating machine.

4 Claims, 3 Drawing Sheets

REFRIGERATING CAPACITY

TEMPERATURE CONTROL SYSTEM FOR ABSORPTION REFRIGERATING APPARATUS

BACKGROUND OF THE INVENTION

This invention relates generally to a temperature control system for an absorption refrigerating apparatus, and more particularly to such a temperature control system which can suitably meet requirements for a large-scale equipment (e.g. an area-wide air-conditioning), such as a quick response to a load change and an improved precision of an outlet temperature.

Generally, for example, an absorption refrigerating apparatus used for an area-wide air-conditioning is utilized in a heat supply business, and therefore in many case the outlet temperature of cold water constitutes a feature from the viewpoint of sales. Therefore, it is required to enhance the precision of the outlet temperature of the supply cold water.

In addition, in this type of absorption refrigerating apparatus, it is expected that a capacity control of a wide range is required, and that a quick response to a load change is required.

Further, in connection with the fleon gas problem recently drawing much attention, it is expected that there will be an increasing demand for process-purpose absorption refrigerating apparatus. The requirements for such a process-purpose refrigerating apparatus are also a quick response to a load change and the precision of the cold water outlet temperature.

Referring to the prior art, there is known a technique of a capacity control in a single absorption refrigerating machine, as disclosed, for example, in Japanese Patent Unexamined Publication No. 57-105659.

More specifically, in this prior art technique, the absorption refrigerating machine comprises an evaporator for evaporating a cooling medium by cold water flowing through a load (e.g. an air-conditioner), an absorber for causing the evaporated cooling medium to be absorbed in a solution, a regenerator for separating the solution, which has absorbed the cooling medium, into the cooling medium and the solution by a heated fluid, a condenser for condensing the cooling medium vapor separated by the regenerator, and a cooling water system for cooling the absorber and the condenser. In this absorption refrigerating machine, the temperature of the cold water cooled by the evaporator is detected by a cold water outlet temperature detector, and when the temperature of the cold water is higher than a set temperature, a signal which increases the degree of opening by an amount proportional to the deviation is sent to a control valve for controlling the flow rate of the heated fluid to be fed to the regenerator. Thus, the cold water temperature is controlled by a so-called proportional control.

The proportional control known as the conventional technique is a simple control as disclosed in the above Japanese Patent Unexamined Publication No. 57-105659, and the proportional control can make the response to the load quicker, but suffers from a problem that the precision of the outlet temperature of the cold water is not so good.

A proportional-plus-integral-plus-derivative control (hereinafter referred to as "PID control") also known as a conventional control achieves a good precision of the cold water outlet temperature; however, in the type of absorption refrigerating machine in which the time constant is long, in order that the cold water outlet temperature will not overshoot a target temperature when activating the refrigerating machine, the PID control is so adjusted as to obtain a relatively slow response, and therefore a problem is encountered in association with the response speed.

However, there has not yet been known any capacity control apparatus or any temperature control system in which two or more controls are performed at the same time with respect to a single refrigerating machine.

There is now an increasing need for a very large-size, highly-efficient absorption refrigerating apparatus, and the manufacturers take the minimum cost into consideration in connection with the production technology, the transportation method and so on. Under such circumstances, it is expected that a so-called system refrigerating apparatus, constituted by a combination of two or more absorption refrigerating machines so as to perform a predetermined refrigerating ability, will become a main stream of very large-size absorption refrigerating apparatus. However, there has not yet been known any particular prior art related to a combination of temperature controls for the plurality of absorption refrigerating machines which are combined together with respect to the flow of the cold water to be circulated at the load side so as to perform a predetermined ability.

In view of such a background, the simultaneous temperature control of two or more refrigerating machines is necessary, and also it is necessary to enhance the precision of the cold water outlet temperature and to increase the response speed.

SUMMARY OF THE INVENTION

It is an object of this invention to overcome the above-mentioned problems of the prior art.

Another object of the invention is to provide an absorption refrigerating apparatus which has no problem in a response speed.

A further object of the invention is to provide a temperature control system which controls a refrigerating apparatus by combining a proportional control, which effects a control by detecting an inlet temperature or an intermediate path temperature of cold water, with a PID control which effects a control by detecting an outlet temperature of the cold water.

A still further object of the invention is to provide a temperature control system for an absorption refrigerating apparatus, in which absorption refrigerating machines are arranged in at least two stages with respect to the flow of cold water to be circulated at a load side, and the precision of cold water outlet temperature is improved, and the response to a load change can be made quick.

A further object of the invention is to provide a temperature control system for an absorption refrigerating apparatus, the absorption refrigerating apparatus comprising absorption refrigerating machines arranged in at least two stages with respect to the flow of cold water to be circulated at a load side, each of the absorption refrigerating machines comprising an evaporator, an absorber, a condenser, a regenerator, a solution heat exchanger, a solution pump, a cooling medium pump, and piping operatively connecting the parts of the absorption refrigerating machine together; the temperature control system comprising cold water outlet temperature detectors for detecting cold water outlet temperatures of the absorption refrigerating machines of the stages, respectively, and temperature controllers for controlling the amounts of heat of a heated fluid in accordance with the cold water outlet temperatures of the absorption refrigerating machines of the stages, respectively, the heated fluid driving the absorption refrigerating machine of each stage; and a control circuit being so arranged that the temperature controller of the first stage, or the temperature controllers of the intermediate stages except for the temperature controller of the final stage are controlled by a proportional control whereas the temperature controller of the final stage is controlled by a PID control.

In one aspect of the present invention, a cold water inlet temperature of an absorption refrigerating machine is detected, and a proportional control is effected. In the case of the proportional control, when a load is changed, the ratio between a deviation of a measured value from the target cold water outlet temperature and the operating output (i.e., a signal for increasing and decreasing the heat input for driving the absorption refrigerating machine) is always constant, and therefore the response of a capacity change at the time of change of the cold water inlet temperature is good. However, due to temperature conditions of the cooling water and to the fact that the flow rate characteristic of a control valve for controlling the heat input for driving the refrigerating machine is not linear, a deviation of the cold water outlet temperature from the target value inevitably develops only with the proportional control. Therefore, in order to correct this deviation, the cold water outlet temperature is detected, and a PID control is effected so as to add an integral action to the corrective action, and a cascade control is effected by its output so as to change the set value of the outlet temperature. By doing so, the cold water outlet temperature is corrected to the target value, and the precision of the outlet temperature is improved.

In another aspect of the present invention, for example, two absorption refrigerating machines are so combined together as to achieve a predetermined cooling capacity. The two refrigerating machines are arranged serially in two stages so that cold water can flow sequentially through the first-stage and second-stage refrigerating machines in this order. A proportional control is effected with respect to the first-stage refrigerating machine which is disposed at the cold water inlet side subjected to higher temperature. In the case of the proportional control, the ratio between a deviation of a measured value (which is detected by a cold water outlet temperature detector) from the target cold water outlet temperature and the operating output (i.e., a signal for increasing and decreasing the heat input of the heated fluid for driving the absorption refrigerating machine) is always constant, and therefore the response of the cold water outlet temperature at the time of change of the cold water inlet temperature is enhanced.

Then, a PID control is effected with respect to the second-stage refrigerating machine which is disposed at the cold water outlet side subjected to lower temperature. Mainly by the integral action of the PID control, the cold water outlet temperature of the second-stage refrigerating machine is kept constant. Since the second-stage machine is subjected to the PID control, the cold water outlet temperature of the first-stage machine is the inlet temperature of the second-stage machine, and the range of change of the temperature becomes less. As a result, variations in the cold water outlet temperature become less, so that the precision of the cold water outlet temperature is improved.

DESCRIPTION OF THE PREFERRED EMBODIMENTS

A preferred embodiment of the present invention will now be described with reference to FIGS. 1 to 4.

Figure 1:
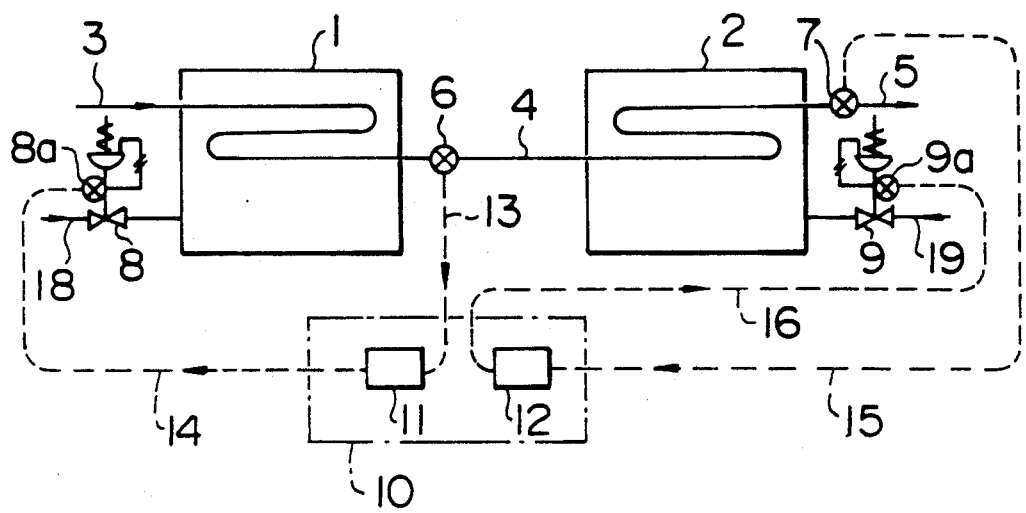
FIG. 1 is a schematic circuit diagram showing a temperature control system for a vapor-double-effect absorption refrigerating apparatus of a two-stage arrangement, provided according to a first embodiment of the present invention.

A vapor-double-effect absorption refrigerating apparatus shown in FIG. 1 comprises two refrigerating machines arranged in series in two stages with respect to the flow of cold water to be circulated at a load side. Although not shown in the drawings, each of the absorption refrigerating machine 1 (hereinafter referred to as "first-stage machine") at the first stage and the absorption refrigerating machine 2 (hereinafter referred to as "second-stage machine") at the second stage comprises an evaporator, an absorber, a condenser, a regenerator, a solution heat exchanger, a solution pump, a cooling medium pump, and a piping operatively connecting these component parts together.

In FIG. 1, the reference numeral 3 denotes a cold water inlet, the reference numeral 4 denotes an cold water outlet of the first-stage machine 1, and the reference numeral 5 denotes a cold water outlet. As indicated by a solid line, the cold water flows in series, that is, enters the first-stage machine 1, and then flows into the second-stage machine 2.

Although not shown in the drawings, more specifically, the cold water line constitutes a circulating passage in which the cold water from the cold water inlet 3 passes sequentially through the evaporator of the first-stage machine 1, the first-stage machine cold water outlet 4, the evaporator of the second-stage machine 2 and the cold water outlet 5, and then is supplied to the load, and then is returned to the cold water inlet 3.

A first-stage machine cold water outlet temperature detector 6 is provided at the first-stage machine cold water outlet 4, and a second-stage machine cold water outlet temperature detector 7 is provided at the cold water outlet (the outlet of the second-stage machine) 5.

The reference numeral 8 denotes a first-stage machine pneumatic vapor control valve for controlling the flow rate of a first-stage machine-driving heated fluid. The reference numeral 9 denotes a second-stage machine pneumatic vapor control valve for controlling the flow rate of a second-stage machine-driving heated fluid. The reference numerals 8a and 9a denote pneumatic-to-electrical converters for the first-stage machine pneumatic vapor control valve 8 and the second-stage machine pneumatic vapor control valve 9, respectively. The pneumatic-to-electrical converter converts an electrical signal to a pneumatic signal so as to drive the pneumatic vapor control valve of the diaphragm type. Here, each of the first-stage machine pneumatic vapor control valve 8 and the second-stage machine pneumatic vapor control valve 9 functions as a flow control valve for controlling the rate of flow of the heated fluid (vapor in this embodiment) into the regenerator (not shown) of each of the first-stage and second-stage machines 1 and 2.

The reference numeral 10 denotes a refrigerating machine control panel, the reference numeral 11 denotes a first-stage machine temperature controller, and the reference numeral 12 denotes a second-stage machine temperature controller.

Control lines indicated by broken lines represent electrical signals, and the reference numeral 13 denotes a first-stage machine cold water outlet temperature detection signal, the reference numeral 14 a first-stage machine operating output signal, the reference numeral 15 a second-stage machine cold water outlet temperature detection signal, and the reference numeral 16 a second-stage machine operating output signal.

A first-stage machine-driving vapor inlet 18 is connected to the regenerator (not shown) of the first-stage machine 1, and a second-stage machine-driving vapor inlet 19 is connected to the regenerator (not shown) of the second-stage machine 2.

Next, the control system will now be described.

The temperature of the cold water outlet 4 of the first-stage machine 1 is measured by the first-stage machine cold water outlet temperature detector 6, and the first-stage machine cold water outlet temperature signal 13 is fed from this detector 6 to the first-stage machine temperature controller 11. The first-stage machine temperature controller 11 effects a proportional control, and feeds the first-stage machine operating output signal 14, which is proportional to a deviation of the temperature detection signal 13 from a set cold water outlet temperature of the first-stage machine 1, to the first-stage machine pneumatic vapor control valve 8, thereby controlling the flow rate of the vapor at the first-stage machine-driving vapor inlet 18.

Next, the temperature of the cold water outlet 5 of the second-stage machine 2 is measured by the second-stage machine cold water outlet temperature detector 7, and the second-stage machine cold water outlet temperature detection signal 15 is fed from this detector 7 to the second-stage machine temperature controller 12. The second-stage machine temperature controller 12 effects a PID control, and feeds the second-stage machine operating output signal 16, which represents a PID control signal corresponding to a deviation of the temperature detection signal 15 from a set cold water outlet temperature of the second-stag machine 2, to the second-stage machine pneumatic vapor control valve 9, thereby controlling the flow rate of the vapor at the second-stage machine-driving vapor inlet 19.

Figure 2:
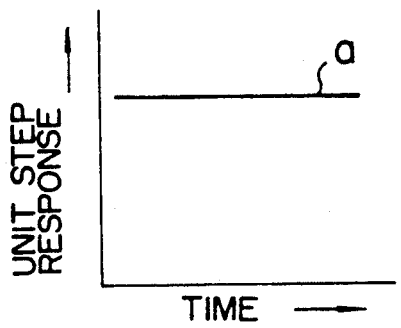
FIG. 2 is a graph showing a change of a unit step response with time, obtained when an input signal is changed in a stepping manner, in a proportional control.
Figure 3:
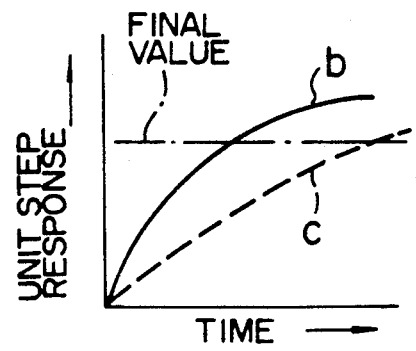
FIG. 3 is a graph showing a change of a unit step response with time, obtained when an input signal is changed in a stepping manner, in a PID control.

FIG. 2 shows the case where the proportional control is effected with respect to one refrigerating machine, and FIG. 3 shows the case where the PID control is effected with respect to one refrigerating machine. These Figures, provided for comparison purposes, show a change of a unit step response with time, when the input signal (the deviation of the measured value from the target cold water outlet temperature) is changed in a stepping manner.

In the case of the proportional control shown in FIG. 2, the response of the unit step is constant as indicated by a line a since the gain is constant.

On the other hand, in the case of the PID control shown in FIG. 3, the response of the unit step gradually increases with time. Even if the heat input is adjusted relative to the load change, the temperature of the cold water does not immediately vary correspondingly. Namely, the larger the time constant is, the longer time which elapses until the operating output reaches the final value, as indicated by lines b and c, and therefore it will be appreciated that the larger the time constant is, the worse the response is, as compared with the proportional control.

Therefore, in this embodiment, the first-stage machine 1 is subjected to the proportional control, and by doing so, the response of the cold water outlet temperature at the time of change of the cold water inlet temperature can be made quick.

Figure 4:
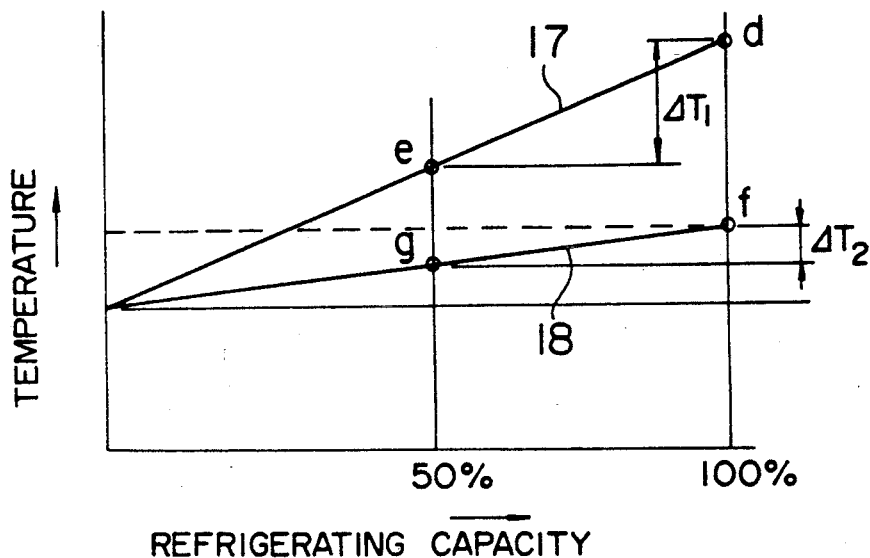
FIG. 4 is a graph showing a change of a cold water outlet temperature relative to a change of a refrigerating capacity.

FIG. 4 shows a change of the cold water inlet temperature 17 of the first-stage machine and a change of the cold water outlet temperature 18 of the first-stage machine relative to a change of the refrigerating capacity.

The cold water inlet temperature e at 50% of the refrigerating capacity is lower by $\Delta T_1$ than the cold water inlet temperature d at 100% of the refrigerating capacity. On the other hand, the cold water outlet temperature g of the first-stage machine at 50% of the refrigerating capacity is lower by $\Delta T_2$ than the cold water outlet temperature f at 100% of the refrigerating capacity. This indicates that the amount of change of the cold water outlet temperature 18 is smaller than the amount of change of the cold water inlet temperature 17.

Namely, in this embodiment, since the cold water outlet temperature of the first-stage machine 1 is the cold water inlet temperature of the second-stage machine 2, the range of temperature change is small, and therefore the precision of the cold water outlet temperature of the second-stage machine 2 can be improved correspondingly.

In this embodiment, the precision of the cold water outlet temperature of the absorption refrigerating machines, arranged in series in two stages with respect to the flow of the cold water to be circulated at the load side, can be enhanced. And besides, the response to the load change can be made quick.

Further, since the capacity undertaken by the second-stage machine 2 becomes about half, the time constant becomes smaller, and therefore the response of the second-stage machine 2 subjected to the PID control can also be made quick.

In the above embodiment, although the temperature control of the absorption refrigerating apparatus comprising the two (first-stage and second-stage) refrigerating machines has been described, the present invention is not limited to such arrangement, and the present invention can also be applied to the temperature control of an absorption refrigerating apparatus comprising three or more refrigerating machines. In this case, all of the refrigerating machines except for the refrigerating machine of the final stage are controlled by the proportional control, and the refrigerating machine of the final stage is control by the PID control. By doing so, the response to the load change can be made quick, and the precision of the cold water outlet temperature can be improved.

In the above embodiment, although the heat amount of the driving heated fluid for the absorption refrigerating machine of each stage is controlled by the pneumatic vapor control valve, the present invention is not limited thereto, and any other suitable control valve may be used.

As described above, in the above embodiment, there is provided the temperature control system for the absorption refrigerating machines arranged in at least two stages with respect to the flow of the cold water to be circulated at the load side, wherein the precision of the cold water outlet temperature can be improved, and also the response to the load change can be made quick.

Figure 5:
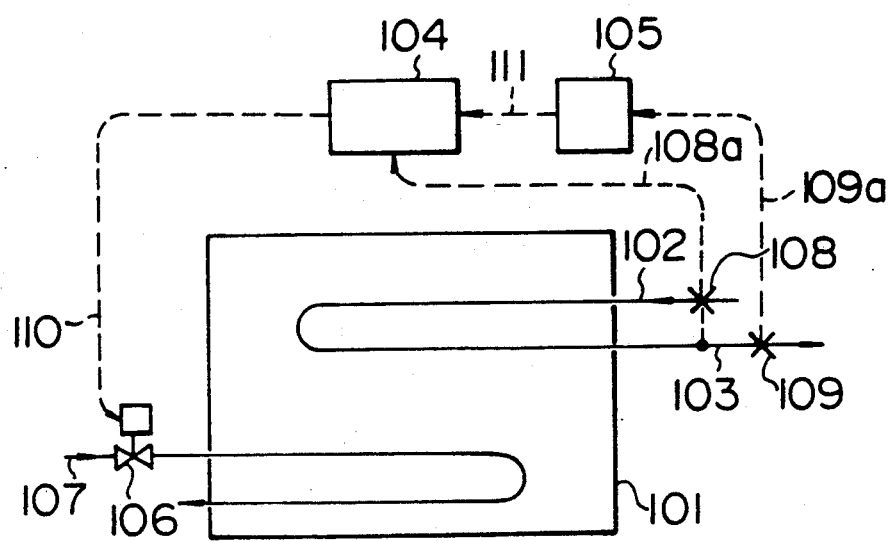
FIG. 5 is a schematic circuit diagram showing a temperature control system for an absorption refrigerating apparatus provided according to another embodiment of the present invention.

Next, another embodiment of the present invention will now be described with reference to FIGS. 5, 6A and 6B. FIG. 5 schematically shows a vapor-double-effect absorption refrigerating apparatus. Cold water from a cold water inlet 102 passes through an evaporator (not shown) within a refrigerating machine body, and passes through a cold water outlet 103, and is supplied to a load, and then is returned to the cold water inlet 102. Vapor from a vapor inlet 107 passes through a vapor control valve 106, and drives a regenerator (not shown) within the refrigerating machine body 101, and then is discharged from the refrigerating machine body 101. The cold water inlet temperature at the cold water inlet 102 is detected by a cold water inlet temperature detector 108, and a cold water inlet temperature detection signal 108a is fed to a proportional controller 104 where this detection signal 108a is compared with a set value to effect a proportional control, and an operating output 110 from the proportional controller 104 controls the vapor control valve 106. Here, when the load is changed, so that the cold water outlet temperature at the cold water outlet 103 deviates from a set temperature, a cold water outlet temperature detector 109 detects the cold water outlet temperature at the cold water outlet 103, and a cold water outlet temperature detection signal 109a is fed to a PID controller 105, and an output 111 from this PID controller 105 is fed to the proportional controller 104, so that an offset is given so as to change the set value of the cold water outlet temperature, thereby correcting the deviation.

Figure 6A:
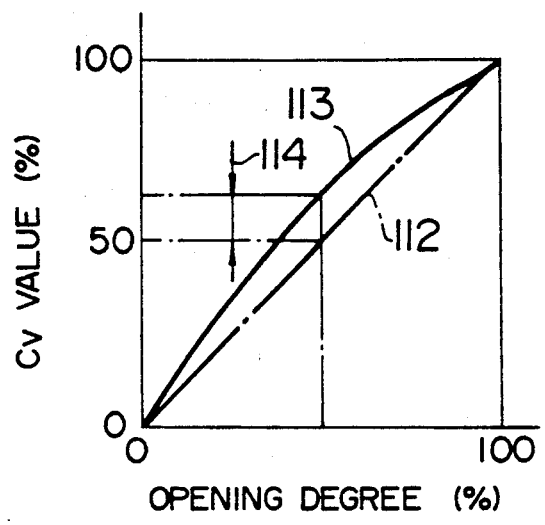
FIG. 6A is a graph showing a flow rate characteristic of a vapor control valve (a Cv value with respect to the degree of valve opening)
Figure 6B:
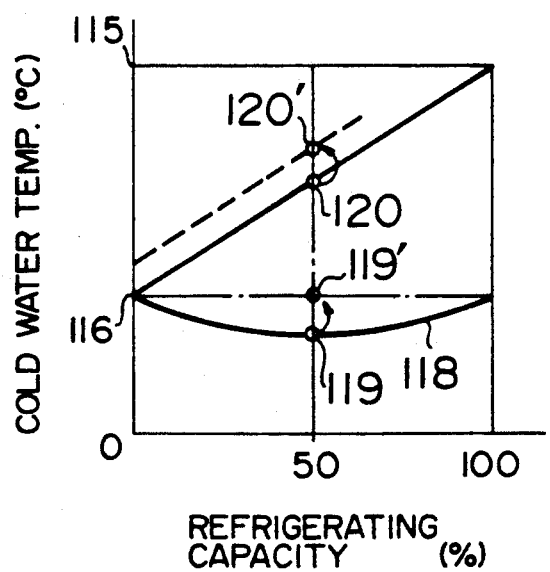
FIG. 6B is a graph showing a change of the cold water outlet temperature at the time of change of a load, and its correction action.

The change of a Cv value relative to the degree of opening of the vapor control valve when the load is changed is shown in FIG. 6A, and the change of the cold water outlet temperature relative to the refrigerating capacity, as well as the correction of the cold water outlet temperature, is shown in FIG. 6B. As shown in FIG. 6A, a general characteristic curve 113 of the control valve is convex upwardly, and for example, when the load is changed from 100% to 50%, the degree of opening of the vapor control valve is changed to 50% by the signal from the proportional controller 104. However, the actual vapor flow rate, that is, the Cv value, will not become half when the load is 100%, and a deviation corresponding to an excess vapor flow rate 114 develops. This excess vapor invites the cold water outlet temperature 119 as shown in FIG. 6B, and the signal representative of the cold water outlet temperature 119 is fed to the PID controller 105 for the purpose of correcting the deviation of this temperature from the set value 116, and the output from the PID controller 105 is fed to the proportional controller 104 to change the set value 120 of the cold water inlet temperature to a value 120'. This change of the set value is carried out gently by the integral action of the PID controller, and therefore hunting and etc., are prevented. As a result, the cold water outlet temperature 119 is corrected to a value 119' to coincide with the set value 116.

In this embodiment, the cold water outlet temperature of the refrigerating machine can be kept constant, and also the response at the time of activating the refrigerating machine or at the time of change of the load can be made quick.

What is claimed is:

1. A temperature control system for an absorption refrigerating apparatus, said absorption refrigerating apparatus comprising absorption refrigerating machines arranged in at least two stages with respect to the flow of cold water to be circulated at a load side, each of said absorption refrigerating machines comprising an evaporator, an absorber, a condenser, a regenerator, a solution heat exchanger, a solution pump, a cooling medium pump, and piping operatively connecting said parts of said absorption refrigerating machine together; said temperature control system comprising cold water outlet temperature detectors for detecting cold water outlet temperatures of said absorption refrigerating machines of said stages, respectively, and temperature controllers for controlling the amounts of heat of a heated fluid in accordance with the cold water outlet temperatures of said absorption refrigerating machines of said stages, respectively, said heated fluid driving said absorption refrigerating machine of each stage; and a control circuit being so arranged that said temperature controller of the first stage, or said temperature controllers of the intermediate stages except for said temperature controller of the final stage are controlled by a proportional control while said temperature controller of the final stage is controlled by a proportional-plus-integral-plus-derivative control.

2. A temperature control system according to claim 1, in which a vapor control valve is connected to said absorption refrigerating machine of each stage, said vapor control valve being controlled by an output signal from said temperature controller of the corresponding stage.

3. An automatic temperature control system for an absorption refrigerating machine, comprising a proportional controller for detecting an inlet temperature or an intermediate path temperature of cold water so as to control said refrigerating machine, and a PID controller for detecting an outlet temperature of said cold water so as to control said refrigerating machine.

4. An automatic temperature control system for an absorption refrigerating apparatus according to claim 3, in which a vapor control valve is controlled by an output signal from said proportional controller.

* * * * *

UNITED STATES PATENT AND TRADEMARK OFFICE
CERTIFICATE OF CORRECTION

PATENT NO. : 5,216,896
DATED      : Jun. 8, 1993
INVENTOR(S): Uchida, et al.

It is certified that error appears in the above-identified patent and that said Letters Patent is hereby corrected as shown below:

On the title page, item (73) Assignee: Insert the followings:

--Hitachi, Ltd. Tokoyo, Japan --.

Signed and Sealed this

Fifth Day of April, 1994

Attest:

BRUCE LEHMAN

Attesting Officer

Commissioner of Patents and Trademarks